(12) United States Patent
Robinson et al.

(10) Patent No.: US 10,353,077 B2
(45) Date of Patent: Jul. 16, 2019

(54) POSITION AND MOTION INFORMED NAVIGATION SYSTEM

(71) Applicant: Raytheon Company, Waltham, MA (US)

(72) Inventors: Ian S. Robinson, Redondo Beach, CA (US); Andrew M. Hautzik, Rancho Palos Verdes, CA (US); Brandon Crow, Gardena, CA (US)

(73) Assignee: Raytheon Company, Waltham, MA (US)

( * ) Notice: Subject to any disclaimer, the term of this patent is extended or adjusted under 35 U.S.C. 154(b) by 737 days.

(21) Appl. No.: 14/453,537

(22) Filed: Aug. 6, 2014

(65) Prior Publication Data

US 2016/0266259 A1    Sep. 15, 2016

(51) Int. Cl.
| | | |
|---|---|---|
| *G01S 19/42* | (2010.01) | |
| *G01S 19/46* | (2010.01) | |
| *G01S 19/21* | (2010.01) | |
| *G01S 19/50* | (2010.01) | |

(52) U.S. Cl.
CPC .......... *G01S 19/42* (2013.01); *G01S 19/215* (2013.01); *G01S 19/426* (2013.01); *G01S 19/46* (2013.01); *G01S 19/50* (2013.01)

(58) Field of Classification Search
CPC .............................. G01S 19/215; G01S 19/426
USPC ..................................................... 342/357.25
See application file for complete search history.

(56) References Cited

U.S. PATENT DOCUMENTS

| | | | | |
|---|---|---|---|---|
| 2008/0180315 A1* | 7/2008 | Tarlow | .................... | G01S 19/42 342/357.25 |
| 2010/0318292 A1* | 12/2010 | Kulik | ................... | G01C 21/165 701/414 |
| 2012/0221244 A1* | 8/2012 | Georgy | ................ | G01C 21/165 701/472 |

OTHER PUBLICATIONS

GPS Essentials of Satellite Navigation. Compendium. www.u-blox.com (Year: 2009).*
GPS/INS, Wikipedia, http://en.wikipedia.org/wiki/GPS/INS, date accessed is prior to the application filing date, 2 pages, United States.

* cited by examiner

*Primary Examiner* — Vladimir Magloire
*Assistant Examiner* — Helena H Seraydaryan

(57) ABSTRACT

A global positioning system (GPS) receiver and system for determining a geographical location associated with the GPS receiver using less than four GPS signals. The system can comprise a constraint module configured to receive one or more constraints that describe at least one characteristic of a GPS receiver when a number of GPS satellites within a line of sight to the GPS receiver is below a defined value. The system can further comprise a pseudo range calculation module configured to calculate a plurality of pseudo ranges between the GPS receiver and the number GPS satellites, wherein the plurality of pseudo ranges are to various orbital positions of the GPS satellites over a period of time; and a geographical location module configured to determine the geographical location of the GPS receiver using the plurality of pseudo ranges and known constraints of motion associated with the GPS receiver.

6 Claims, 9 Drawing Sheets

| Constraint | Comment | Minimum Satellites |
|---|---|---|
| Static, Known Altitude | Known velocity, known altitude equivalent | 1 |
| Static, Unknown but Constant Altitude | Known or No acceleration | 2 |
| Constant Known Velocity, Unknown Altitude | Known or No acceleration | 2 |
| Constant but Unknown Horizontal Velocity, Known Constant Altitude | Known or No acceleration | 2 |
| Unknown Horizontal Velocity, Known Constant Altitude | Known or No acceleration | 2 |
| Constant but Unknown Horizontal Velocity, Unknown but Constant Altitude | Known or No acceleration | 2 slow, 3 fast |
| Unknown Horizontal Velocity, Unknown but Constant Vertical Velocity | Known or No acceleration in one axis | 2 slow, 3 fast |
| Unknown Vertical Velocity, Unknown but Constant Horizontal Velocity | Known or No acceleration in one axis | 2 slow, 3 fast |
| Unknown, Unconstrained acceleration Horizontal or Vertical | | 4 |

FIG. 2

| | Static, Constant Altitude | Static, Unknown but Constant Altitude | Constant Known Horizontal Velocity, Unknown Altitude | Constant Known Velocity, but Unknown Constant Altitude | Constant Unknown Horizontal Velocity, Unknown but Constant Altitude | Unknown Horizontal Velocity, Unknown but Constrained Vertical Velocity | Unknown Vertical Velocity, Unknown but Constant Horizontal Velocity | Unconstrained Position and Velocity |
|---|---|---|---|---|---|---|---|---|
| X | $x(t+1)=x(t)$ | $x(t+1)=x(t)$ | $x(t+1)=x(t)+V_xDt$ | $x(t+1)=x(t)+V_xDt$ | $x(t+1)=x(t)+V_xDt$ | $x(t+1)=x(t)+V_xDt$ | $x(t+1)=x(t)+V_xDt$ | $x(t+1)=x(t)+V_xDt$ |
| Y | $y(t+1)=y(t)$ | $y(t+1)=y(t)$ | $y(t+1)=y(t)+V_yDt$ | $y(t+1)=y(t)+V_yDt$ | $y(t+1)=y(t)+V_yDt$ | $y(t+1)=y(t)+V_yDt$ | $y(t+1)=y(t)+V_yDt$ | $y(t+1)=y(t)+V_yDt$ |
| Z | $z=K$ | $z(t+1)=z(t)$ | $z=K$ | $z(t+1)=z(t)$ | $z(t+1)=z(t)$ | $z(t+1)=z(t)+V_zDt$ | $z(t+1)=z(t)+V_zDt$ | $z(t+1)=z(t)+V_zDt$ |
| Vx | 0 | 0 | $V_x=K$ | $V_x=K$ | $V_x(t+1)=V_x(t)$ | $V_x(t+1)=V_x(t)+A_xDt$ | $V_x(t+1)=V_x(t)$ | $V_x(t+1)=V_x(t)+A_xDt$ |
| Vy | 0 | 0 | $V_y=K$ | $V_y=K$ | $V_y(t+1)=V_y(t)$ | $V_y(t+1)=V_y(t)+A_yDt$ | $V_y(t+1)=V_y(t)$ | $V_y(t+1)=V_y(t)+A_yDt$ |
| Vz | 0 | 0 | $V_z=0$ | 0 | 0 | $V_z(t+1)=V_z(t)$ | $V_z(t+1)=V_z(t)+A_zDt$ | $V_z(t+1)=V_z(t)+A_zDt$ |
| Ax | 0 | 0 | 0 | 0 | 0 | $A_x(t+1)=A_x(t)$ | 0 | $A_x(t+1)=A_x(t)$ |
| Ay | 0 | 0 | 0 | 0 | 0 | $A_y(t+1)=A_y(t)$ | 0 | $A_y(t+1)=A_y(t)$ |
| Az | 0 | 0 | 0 | 0 | 0 | 0 | $A_z(t+1)=A_z(t)$ | $A_z(t+1)=A_z(t)$ |
| Clock Bias | $b(t+1)=b(t)$ | $b(t+1)=b(t)$ | $b(t+1)=b(t)$ | $b(t+1)=b(t)$ | $b(t+1)=b(t)$ | $b(t+1)=b(t)$ | $b(t+1)=b(t)$ | $b(t+1)=b(t)$ |
| Clock Freq | $f(t+1)=f(t)$ | $f(t+1)=f(t)$ | $f(t+1)=f(t)$ | $f(t+1)=f(t)$ | $f(t+1)=f(t)$ | $f(t+1)=f(t)$ | $f(t+1)=f(t)$ | $f(t+1)=f(t)$ |

Number of GPS Satellites Available: ___2___

Please Enter the Applicable Constraints:

|  | Unknown | Known |  | Constant ? |  |
|---|---|---|---|---|---|
| Altitude: | ☐ | ☒ ___800___ (in meters) | | (YES) | NO |
| Velocity: | | | | | |
|   Horizontal: | ☐ | ☒ ___0___ (in m/s) | | (YES) | NO |
|   Vertical: | ☐ | ☒ ___0___ (in m/s) | | (YES) | NO |
| Acceleration: | | | | | |
|   Horizontal: | ☐ | ☒ ___0___ (in m/s) | | (YES) | NO |
|   Vertical: | ☐ | ☒ ___0___ (in m/s) | | (YES) | NO |

Sufficient Constraints to Determine Location Using Available GPS Satellites: ___YES___

Estimated Time to Determine Location: ___10 seconds___

Number of GPS Satellites Available: ___1___

Please Enter the Applicable Constraints:

|  | Unknown | Known |  | Constant ? |  |
|---|---|---|---|---|---|
| Altitude: | ☒ | ☐ _____ (in meters) | | YES | NO |
| Velocity: | | | | | |
| Horizontal: | ☒ | ☐ _____ (in m/s) | | YES | NO |
| Vertical: | ☐ | ☒ __0__ (in m/s) | | YES | NO |
| Acceleration: | | | | | |
| Horizontal: | ☐ | ☒ __0__ (in m/s) | | YES | NO |
| Vertical: | ☐ | ☒ __0__ (in m/s) | | YES | NO |

Sufficient Constraints to Determine Location Using Available GPS Satellites: ___NO___

Please Constrain (if possible): ___Altitude___
                                    ___Horizontal Velocity___

*FIG. 5B*

POSITION AND MOTION INFORMED NAVIGATION SYSTEM

BACKGROUND

The number of Global Positioning System (GPS) devices has grown rapidly in recent years among military, civil and commercial users around the world. GPS is a space-based satellite navigation system that provides location and time information. In general, GPS can function anywhere on or near the Earth where there is an unobstructed line of sight to a plurality of GPS satellites. In some situations, GPS receivers can locate themselves in three spatial dimensions and time where there is an unobstructed line of sight four or more GPS satellites. However, GPS based position information may not be accessible in canyons or mountainous areas, in urban regions with many buildings, when there is an outage of a GPS satellite, inside buildings, subterranean locations, or underwater. GPS has a variety of uses on land, at sea, and in the air for both commercial and military applications. For example, GPS may facilitate activities such as banking, mobile phone operations, navigation of commercial or military aircraft and boats, scientific studies, tracking, and surveillance, etc.

The GPS can include three major segments: a space segment (SS), a control segment (CS), and a user segment (US). The United States Air Force develops, maintains, and operates the space and control segments for GPS activities in the United States. GPS satellites broadcast signals from space, and each GPS receiver uses these signals to calculate a three-dimensional location (latitude, longitude, and altitude) of the GPS receiver and a current time at each GPS satellite. The space segment can include a constellation of 24 to 32 satellites in a medium Earth orbit (MEO). The control segment can include a master control station, an alternate master control station, and a host of dedicated and shared ground antennas and monitor stations.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2 is a table that illustrates a hierarchy of constraints that describe a position or motion of a vehicle and a corresponding number of minimum global positioning system (GPS) satellites that are required in order for the vehicle to determine its geographical location in accordance with an embodiment of the present invention.

FIG. 4 is a table of known correlations for determining a geographical location or motion associated with a vehicle with respect to previous geographical locations or motions associated with the vehicle in accordance with an embodiment of the present invention.

FIGS. 5A and 5B are example user interfaces that enable a user to provide one or more constraints that describe a vehicle for determining a geographical location associated with the vehicle in accordance with an embodiment of the present invention.

Figure 1:
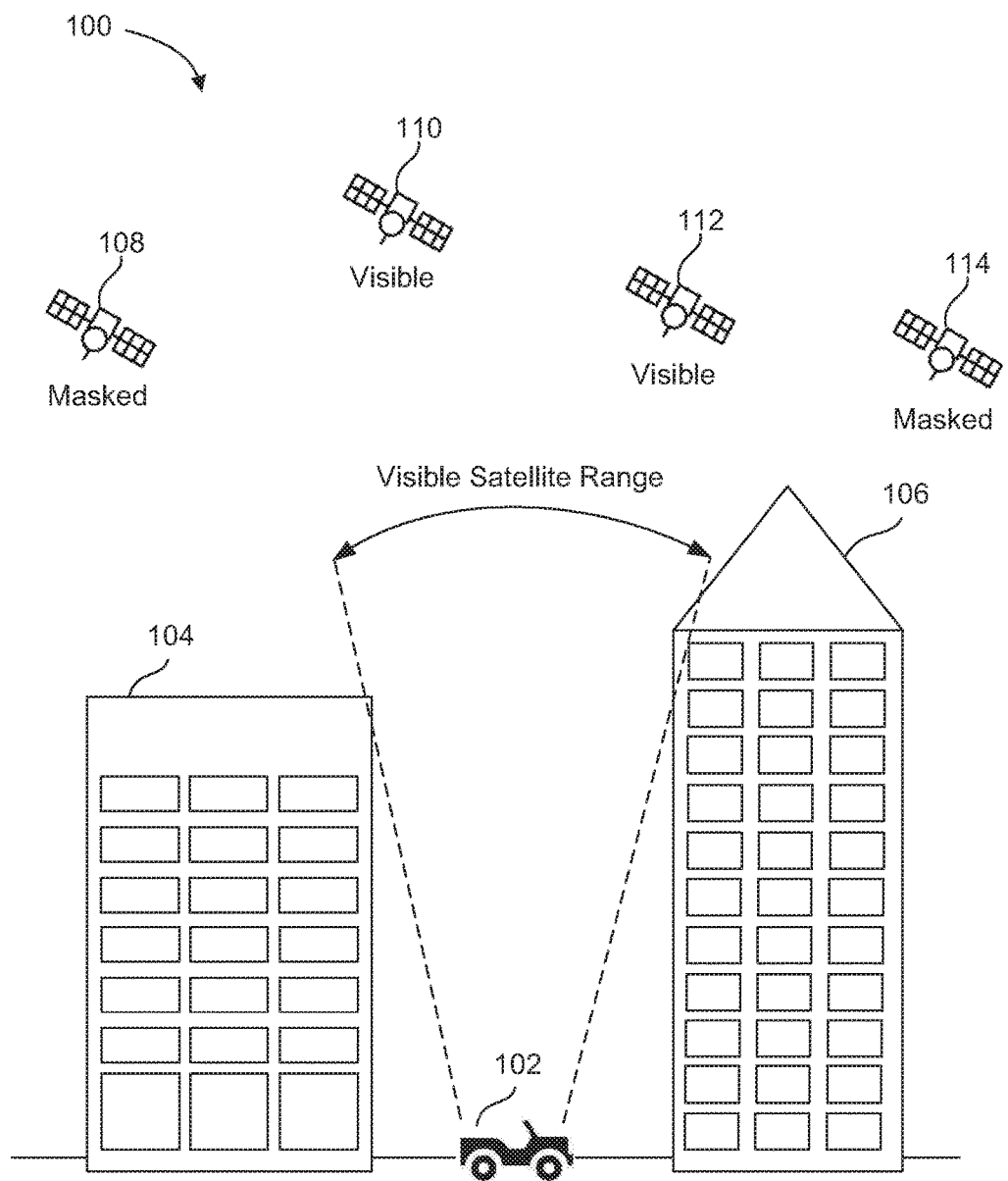
FIG. 1 is an example illustration of a vehicle located within an urban canyon which prevents the vehicle from receiving global positioning system (GPS) signals from masked satellites in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A global positioning system (GPS) receiver is described for determining a geographical location associated with the GPS receiver using less than four GPS signals. A traditional GPS receiver can receive GPS signals from each of four corresponding GPS satellites in order to determine the GPS receiver's geographical location. The four GPS signals required for the traditional GPS receiver can solve for four known variables—latitude, longitude, altitude, and time. However, the novel GPS receiver described herein can determine the geographical location using one to three GPS signals. An ability to determine the geographical location of the GPS receiver using less than four GPS signals can be beneficial when the GPS receiver does not have a line of sight to the GPS satellites (e.g., due to mountains, hills, bridges, buildings or any other objects that mask or block a line of site to a satellite).

The GPS receiver can use the GPS signals received from the GPS satellites in order to determine the geographical location in three coordinates (X, Y, Z). The geographical location can also be represented in terms of latitude, longitude, and altitude. Alternatively, the geographical location can be represented in terms of north, east, and down. In addition, the GPS receiver can determine a time difference between a clock in the GPS receiver and a clock in the GPS satellites. In some examples, the GPS receiver can utilize multiple measurements of GPS signals over time to determine a velocity and/or acceleration associated with the GPS receiver using the GPS signals received from the GPS satellites. The velocity and acceleration can each be determined in three dimensions (i.e., X, Y and Z). In other words, the GPS receiver can solve for up to ten unknown variables (i.e., latitude, longitude, altitude, velocity in three dimensions, acceleration in three dimensions, and time) when determining the geographical location of the GPS receiver.

In one example, the GPS receiver can receive one or more constraints from a user. Alternatively, the GPS receiver can receive the constraints via one or more sensors coupled to the GPS receiver. The constraints can be known aspects of the GPS receiver's position or motion. For example, the constraints can include a known altitude or elevation (i.e., the GPS receiver's geographic location in the Z dimension). In addition, the constraints can include a known velocity or acceleration associated with the GPS receiver. In one example, the velocity and acceleration can each be zero when the GPS receiver is stationary. Therefore, the constraints can be an absence of or measurement of motion in a given direction, velocity in a given direction, and acceleration in a given direction. For instance, ground receivers have significant constraints on vertical motion. Airborne receivers are aboard platforms that typically know height and at a minimum have accelerometers.

As discussed in further detail below, the constraints can reduce a number of unknown variables to be solved by the GPS receiver (e.g., the GPS receiver's position in three dimensions, velocity in three dimensions, and acceleration in three dimensions). As the number of unknown variables to be solved by the GPS receiver decreases, a number of GPS satellites required by the GPS receiver to solve the unknown variables will decrease. A hierarchy of constraints can provide the number of GPS satellites required by the GPS receiver for determining the position, velocity and/or acceleration. The GPS receiver can determine its position using fewer GPS satellites when more constraints are provided by the user and/or sensors, as opposed to requiring more GPS satellites when fewer constraints are provided. In one example, the GPS receiver can determine its geographical location using one GPS satellite when the GPS receiver is stationary (i.e., the velocity and acceleration are equal to zero) and the altitude associated with the GPS receiver is known. In other examples, the GPS receiver can determine its geographical location using two or three GPS satellites when the GPS receiver is traveling with a velocity and/or acceleration at an unknown altitude.

In one configuration, the GPS receiver can determine its geographical location by combining measurements over time as the GPS satellites orbit around the Earth. For example, a satellite can travel in its orbit, such that the GPS receiver can receive a message from the satellite at four distinct positions over a given period of time. Each of the four messages can include a time the message was transmitted and the satellite's position at the time of the message transmission to the GPS receiver. The GPS receiver can calculate a distance to the satellite's position corresponding to when the satellite transmitted the message to the GPS receiver. Thus, the GPS receiver can have four distances or measurements (which corresponds to the four distinct positions of the satellite). The GPS receiver can determine the four unknowns of its geographical location (i.e., latitude, longitude, altitude, and time) using the four measurements. In other words, the satellite can essentially act like multiple satellites (e.g., four satellites) over the given period of time. On the other hand, traditional GPS receivers determine the geographical location using four measurements from four distinct GPS satellites. As a result, the novel GPS receiver described herein can determine the geographical location using fewer satellites as compared to traditional GPS receivers.

In one configuration, the GPS receiver can improve an accuracy of the geographical location by a constraint that an unknown variable describing the GPS receiver's position or motion is constant. The unknown variable can enable known correlations to be determined. The known correlations can comprise of mathematical relationships between previous information calculated at the GPS receiver relating to the GPS receiver's position or motion and the GPS receiver's current information, such as geographical location and motion. In one example, the GPS receiver can estimate the unknown variables (i.e., position, velocity, and acceleration each in three dimensions) with respect to the previous information using a Kalman filter, rather than estimating the unknown variables independent of the GPS receiver's previous position, velocity, and/or acceleration. The Kalman filter does not use the previous information in scenarios where the GPS receiver's current velocity or acceleration is known to be zero. As a result, the GPS receiver can determine its geographical position and motion with increased accuracy.

FIG. 1 is an example illustration 100 of a vehicle 102 located within an urban canyon. The term "urban canyon" generally refers to an area situated in between a dense block of man-made objects or structures (e.g., buildings) or natural landforms (e.g., hills, mountains, canyons). The term "vehicle" generally refers to a ground-based mobile machine, such as a car, truck, motorcycle, etc. For example, the vehicle 102 can be situated in between skyscrapers 104 and 106. The vehicle 102 can include a global positioning system (GPS) receiver for determining a geographical location associated with the vehicle 102. However, the urban canyon can prevent a line of sight between the vehicle 101 and one or more of the satellites 108, 110, 112 and 114. The vehicle 102 cannot communicate/receive GPS signals to/from the one or more satellites 108, 110, 112 and 114 without establishing a line of sight to the one or more satellites 108, 110, 112 and 114. As a result, the signal blocking effects of the urban canon can prevent the vehicle 102 from determining its geographical location.

As shown in FIG. 1, the urban canyon can create a visible satellite range for the vehicle 102. The satellites which are within the visible satellite range can communicate the GPS signals to the vehicle 102, whereas the satellites that are outside the visible satellite range cannot communicate GPS signals to the vehicle 102. In the example shown, the vehicle 102 can receive GPS signals from the satellites 110 and 112 because the satellites are visible to the vehicle 102 (i.e., within the visible satellite range and in a line of sight). On the other hand, the vehicle 102 is incapable of receiving GPS signals from the satellites 108 and 114 because these satellites are masked to the vehicle 102 (i.e., outside the visible satellite range and out of a line of sight).

Although the GPS receiver is shown in FIG. 1 in a ground vehicle, the GPS receiver can be in or operable with any type of vehicle, such as an airborne vehicle (airplane, helicopter, drone, etc.), a waterborne vehicle (e.g., boat or ship), and any combination of these.

FIG. 2 is a table 200 that illustrates a hierarchy of constraints that describe what is known about the position or motion of a vehicle with an onboard GPS receiver and a corresponding number of minimum global positioning system (GPS) satellites that are required for determining a geographical location of the vehicle at a given velocity and/or acceleration. A GPS receiver can use a plurality of GPS signals received from one or more GPS satellites for determining the position and motion of the GPS receiver (i.e., position in three dimensions, velocity in three dimensions, and acceleration in three dimensions). Each GPS satellite can communicate more than one GPS signal to the GPS receiver over time because, as described in further detail below, each of the GPS satellites can communicate multiple GPS signals to the same receiver due to the GPS satellites being at various orbital positions over a period of time. In other words, the GPS receiver can receive a single signal at a time from each GPS satellite in line of sight. The GPS receiver can measure the signal received from the GPS satellite a plurality of times over a defined interval, as the GPS satellite propagates in its orbit. The position in three dimensions can be represented as X, Y and Z; latitude, longitude and altitude; or north, east and down. In addition, the GPS receiver can determine a time difference between a clock in the GPS receiver and a clock in the GPS satellites. In other words, the GPS receiver can solve for up to ten unknown variables using the GPS signals received from the one or more GPS satellites.

In one configuration, the GPS receiver can receive the one or more constraints that describe known aspects of the GPS receiver's position or motion (e.g., a known altitude, velocity, or acceleration) in order to reduce a number of unknown variables to be solved by the GPS receiver for determining its location. A reduction in the number of unknown variables can also reduce a number of GPS satellites that are needed for the GPS receiver to solve the unknown variables. In one example, the GPS receiver can receive the constraints when the number of GPS satellites in a line of sight to the GPS receiver is below four GPS satellites. On the other hand, the GPS receiver may not need the constraints to determine its geographical location when the GPS receiver is receiving four GPS signals from four corresponding GPS satellites.

In one configuration, the GPS receiver can receive the constraints from a user. For example, the user can possess knowledge with respect to the GPS receiver's altitude or elevation, velocity, and/or acceleration. As another example, the user will know that the velocity and acceleration are equal to zero when the vehicle that contains the GPS receiver is stationary. In an alternative configuration, the GPS receiver can receive the constraints from one or more sensors. The sensors can be coupled to the vehicle that contains the GPS receiver. The sensors can measure an altitude, velocity and/or acceleration and provide the corresponding information to the GPS receiver.

As illustrated in FIG. 2, the hierarchy of constraints can provide the minimum number of GPS satellites for determining the geographical location of the GPS receiver at a given velocity and/or acceleration. In general, a minimum number of GPS satellites observed over time (e.g., less than four) can collectively provide the GPS receiver with sufficient GPS signals for determining the geographical location of the GPS receiver at the given velocity and/or acceleration.

In scenario one (row 1, starting from the top), at least one GPS satellite is required because the GPS receiver is static and has a known altitude, or altitude equivalent (i.e., the receiver has a known velocity and acceleration). In scenario two (row 2), at least two GPS satellites are required because the GPS receiver is static, has an unknown but constant altitude, and a known or no acceleration. In scenario three, at least two GPS satellites are required because the GPS receiver has a constant known velocity, an unknown altitude, and a known or no acceleration. In scenario four, at least two GPS satellites are required because the GPS receiver has a constant but unknown horizontal velocity (i.e., a velocity in the X and Y dimensions), a known constant altitude, and no acceleration. In scenario five, at least two GPS satellites are required because the GPS receiver has an unknown horizontal velocity, a known constant altitude, and a known or no acceleration.

In scenario six, at least two or three GPS satellites are required because the GPS receiver has a constant but unknown horizontal velocity, an unknown but constant altitude, and a known or no acceleration. The minimum number of GPS satellites can be two when the GPS receiver can afford to wait a longer period of time for determining the geographical location. On the other hand, the minimum number of GPS satellites can be three when the GPS receiver desires to determine the geographical location in a shorter period of time. Thus, determining the geographical location having fewer GPS satellites is slower as compared to having more GPS satellites, which allows the determination of the geographical location to be performed faster.

In scenario seven, at least two or three GPS satellites are required (i.e., two GPS satellites result in a slower determination of the geographical location as compared to three GPS satellites) because the GPS receiver has an unknown horizontal velocity, an unknown but constant vertical velocity (i.e., a velocity in the Z dimension), and a known or no acceleration in one axis. In scenario eight, at least two or three GPS satellites are required because the GPS receiver has an unknown vertical velocity, an unknown but constant horizontal velocity, and a known or no acceleration in one axis. In scenario nine, at least four GPS satellites are required because the GPS receiver has an unknown unconstrained acceleration in either the horizontal or vertical direction.

In one configuration, the GPS receiver can determine whether a line of sight is established with at least four satellites (i.e., whether at least four satellites are available). Upon determining that the line of sight is with less than four satellites, the GPS receiver can request the constraints from the user and/or receive the constraints from sensors coupled to or otherwise operable or in communication with the GPS receiver. The GPS receiver can determine whether the geographical location can be determined using the constraints and the number of available satellites. If the GPS determines that the number of available GPS satellites is insufficient with respect to the constraints, the GPS receiver can request additional constraints from the user or wait until at least four GPS satellites become available.

In addition, the GPS receiver can suggest that the user intentionally constrain an aspect of motion (e.g., modify the velocity and acceleration to equal zero), so that the number of available GPS satellites are sufficient for determining the GPS receiver's geographical location. The user can be presented with a menu with suggestions for various constraints to be implemented by the user in order for the GPS receiver to determine the geographical location.

Figure 3:
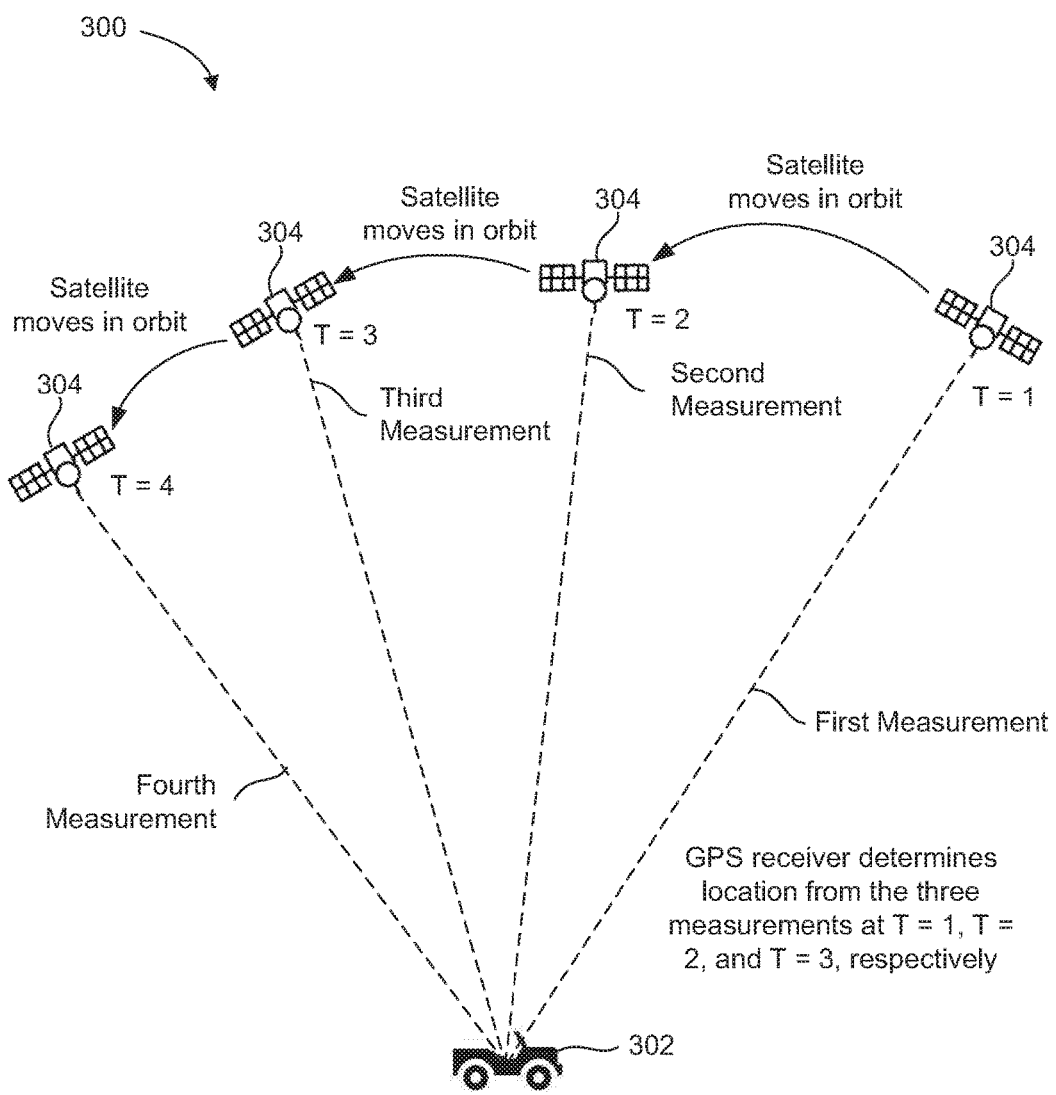
FIG. 3 is an example illustration of a vehicle receiving global positioning system (GPS) signals from a single satellite at various orbital positions of the satellite over a period of time in order for the vehicle to determine its geographical location in accordance with an embodiment of the present invention.

FIG. 3 is an example illustration 300 of a vehicle 302 receiving global positioning system (GPS) signals from a GPS satellite 304 at various positions of the satellites' orbit over a period of time in order for the vehicle 302 to determine its geographical location. The vehicle 302 (via a GPS receiver located in the vehicle 302) can determine the geographical location using less than four GPS satellites (e.g., one to three GPS satellites), depending upon the number of available constraints. In other words, the four unknowns of the vehicle's location (i.e., latitude, longitude, altitude, and time) can be solved using fewer than four GPS satellites, as compared to traditional GPS receivers which require at least four GPS satellites. In addition, if N GPS satellites are desired, then the N GPS satellites can be observed at multiple positions, wherein N is an integer. In the example shown in FIG. 3, N=1. In other words, the constraint can indicate that the GPS receiver is static and is at a known altitude, and therefore, one satellite can be measured over time in order to determine the geographical location of the vehicle 302.

The GPS receiver can determine the geographical location with the fewer than four GPS satellites upon determining that the vehicle 302 has a line of sight to a minimum number of GPS satellites with respect to known constraints of the vehicle 302 (as described in FIG. 2), and then receiving GPS signals from the minimum number of satellites at different points in time (such that the minimum number of satellites effectively function as a number of satellites more than the minimum).

In one configuration, the GPS receiver can combine measurements over time as the GPS satellite 304 orbits around the Earth. For example, at T=1, the GPS satellite 304 can transmit a first message to the GPS receiver. The first message can include a time that the message was transmitted and the GPS satellite position at the time of the message transmission to the GPS receiver. The GPS receiver can calculate a first pseudo range (i.e., distance) to the GPS satellite position at T=1 (i.e., a first measurement). The GPS satellite 304 can continue to move in its orbit and at T=2, the GPS satellite 304 can transmit a second message to the GPS receiver. The GPS receiver can calculate a second pseudo range (i.e., a second measurement) to the GPS satellite position. In other words, when the GPS satellite 304 moves far enough in its orbit, the GPS satellite 304 essentially starts to act like a second GPS satellite. The distance that the GPS satellite 304 needs to move to start acting like the second GPS satellite can be empirically determined.

The GPS satellite 304 can continue to move in its orbit and at T=3, the GPS satellite 304 can transmit a third message to the GPS receiver. The GPS receiver can calculate a third pseudo range (i.e., a third measurement) to the GPS satellite position at T=3. The GPS satellite 304 can continue to move in its orbit and at T=4, the GPS satellite 304 can transmit a fourth message to the GPS receiver. The GPS receiver can calculate a fourth pseudo range (i.e., a fourth measurement) to the GPS satellite position at T=4.

Thus, the GPS receiver can have four distinct pseudo ranges that correspond with four distinct positions of the GPS satellite 304 within its orbit. In one example, the number of pseudo ranges can be greater than the number of GPS satellites available to the GPS receiver. The GPS receiver can determine the four unknowns of its geographical location (i.e., latitude, longitude, altitude, and time) using the four pseudo ranges at times T=1, T=2, T=3 and T=4. In other words, the GPS satellite 304 can essentially act like multiple GPS satellites (e.g., four GPS satellites as shown in FIG. 3) over a given period of time. On the other hand, traditional GPS receivers determine the geographical location using four measurements for four distinct GPS satellites. As a result, the novel GPS receiver described herein can determine the geographical location using fewer GPS satellites as compared to traditional GPS receivers.

In one example, the four pseudo ranges calculated at T=1, T=2, T=3 and T=4 are calculated relatively close together in time. An amount of time to calculate the four pseudo ranges can be less than an allotted amount of reasonable time (e.g., a defined threshold of 1-10 minutes). As a result, a user in the vehicle 302 does not have to wait beyond the reasonable amount of time for the GPS receiver in the vehicle 302 to determine the geographical location. If the number of available GPS satellites prevents the determination of the geographical location within the defined threshold, the GPS receiver can prompt the user for additional constraints that describe an aspect of the vehicle's position or motion.

As another example, when N=2, two satellites can be measured at multiple positions over time in order to determine the geographical location of the vehicle 302. For example, N=2 when a GPS receiver in the vehicle 302 is static, has an unknown but constant altitude, and a known or no acceleration. In general, a number of signals to be measured for determining the geographical location are to correspond to the number of unknown variables.

In an alternative configuration, the GPS receiver can determine the geographical location using pseudo ranges from two or more GPS satellites that are each essentially acting like two or more satellites. In other words, the two GPS satellites essentially act like four GPS satellites over a given period of time. In an additional configuration, the GPS receiver can have a line of sight to three GPS satellites. One of the three GPS satellites can move far enough away in some direction to act like the fourth GPS satellite in order for the GPS receiver to determine the geographical location.

In general, the more GPS satellites that are visible to the GPS receiver, a shorter amount of time is needed for determining the geographical location because the GPS receiver does not have to wait as long for the GPS satellites to move in their orbit around the Earth. For example, the geographical location can be determined faster when two GPS satellites are available as opposed to one GPS satellite. In addition, the one or more constraints that describe the aspect of the vehicle's position or motion (which reduces the number of GPS satellites required) can allow for the combination of measurements from multiple times and multiple GPS satellite positions.

FIG. 4 is a table 400 of known correlations for determining a geographical location or motion associated with a GPS receiver with respect to previous geographical locations or motions associated with the GPS receiver. The geographical location of the GPS receiver can be provided in three dimensions (e.g., latitude, longitude and altitude). In addition, the motion of the GPS receiver (i.e., velocity or acceleration) can each be provided in three dimensions. The known correlations can be used to improve an accuracy of the geographical location and motion, as determined by the GPS receiver combining measurements over time as the GPS satellites orbit the Earth (as described in FIG. 3). The GPS receiver can build on prior estimates of position of the GPS receiver in order to determine the GPS receiver's current position, velocity, and/or acceleration.

The known constraints can equate to simplified mathematical relationships between the previous information and the GPS receiver's current geographical location and motion. In one example, the GPS receiver can estimate the unknown variables (i.e., time, position, velocity, and acceleration) with respect to the previous information using a Kalman filter, rather than estimating the unknown variables independent of the GPS receiver's previous position, velocity, and/or acceleration. The Kalman filter, also known as linear quadratic estimation (LQE), is an algorithm that uses a series of measurements observed over time to produce estimates of unknown variables that tend to be more precise than those based on a single measurement alone. Thus, each time the GPS receiver desires to know its most current geographical location, velocity, or acceleration, the Kalman filter takes into account each of the GPS receiver's previous geographical locations, velocities, and accelerations. As a result, the Kalman filter can solve for the unknown variables with greater accuracy as compared to not using the Kalman filter. The Kalman filter does not use the previous information in the scenarios where the GPS receiver's current velocity or acceleration is known to be zero.

As shown in the table in FIG. 4, known correlations can be used to determine the GPS receiver's current geographical location, velocity, acceleration, and time. The known correlations (or mathematical relationships) depend on the constraints that describe the GPS receiver's geographical location or motion. For example, when the GPS receiver is static and at a constant altitude, the X dimension of the geographical location is calculated by $x(t+1)=x(t)$, the Y dimension of the geographical location is calculated by $y(t+1)=y(t)$, and the Z dimension of the geographical location is calculated by $z=K$ (where K is a constant) because the altitude is already known. A component of the GPS receiver's position, velocity or acceleration does not need to be estimated when already known. Thus, the unknown variables are solved for using known correlations with respect to previous variables that have already been calculated. Since the GPS receiver is static, the velocity in X, Y and Z dimensions is equal to zero and the acceleration in X, Y, and Z dimensions is equal to zero (i.e., previous information regarding the GPS receiver's velocity and acceleration is not used). In addition, a dock bias is calculated by $b(t+1)=b(t)$ and a clock frequency is calculated by $f(t+1)=f(t)$. In addition, FIG. 4 includes known correlations or mathematical relationships to be used by the Kalman filter when the GPS receiver is static with an unknown but constant altitude, the GPS receiver has a constant known horizontal velocity and an unknown altitude, etc.

In one configuration, an accuracy level associated with the GPS receiver's geographical location, velocity and/or acceleration can be estimated and presented to a user. The accuracy level can be estimated based on the number of GPS satellites available to the GPS receiver, the constraints that describe the GPS receiver's position or motion, and a clock type associated with the GPS receiver. The clock type associated with the GPS receiver may be atomic, stable (e.g. military grade or temperature stabilized), or commercial/unstabilized. The accuracy level is generally greater for an atomic clock type, as opposed to a commercial clock type. For example, the GPS receiver can present the user with the GPS receiver's geographical location with a disclaimer that the calculated geographical location can have an error of up to 20 meters in each of the east, north and down dimensions. Similarly, the GPS receiver can present the user with the GPS receiver's velocity and/or acceleration with a disclaimer that the velocity and/or acceleration can have an error of up to 3 meters/second (m/s).

In addition, the user can be presented with a list or menu of possible constraints for the user to perform (e.g., stop the vehicle, drive at a constant velocity, fly at a constant speed and/or altitude, etc.) and a corresponding accuracy level in order to increase the estimated accuracy of the GPS receiver's position and/or motion. In addition, the list or menu can include an estimated amount of time needed for the GPS receiver to determine the position and/or motion using those constraints. For example, the user can be informed that performing certain constraints can improve the estimated error of the GPS receiver's geographical location (in each of the three dimensions) to 3 meters as opposed to 10 meters. Thus, the user can intentionally constrain various aspects of their motion in order to obtain a desired level of accuracy.

FIG. 5A is an example user interface 510 that enables a user to provide one or more constraints that describe an aspect of a vehicle's (or the receiver's) position or motion for determining a geographical location of the receiver as associated with the vehicle. The user interface 510 can be coupled to a GPS receiver within the vehicle. The GPS receiver can receive signals from one or more GPS satellites in order to determine the geographical location of the vehicle. The user interface 510 can display a number of available GPS satellites (e.g., 2 GPS satellites). The GPS satellites are available when the GPS satellites are in a line of sight with the GPS receiver. The user interface 510 can prompt the user to enter known constraints that describe the vehicle's position or motion. For example, the user can enter a known altitude of 800 meters, a known horizontal velocity of 0 m/s (i.e., a velocity in the X and Y dimensions), a known vertical velocity of 0 m/s (i.e., a velocity in the Z dimension), a known horizontal acceleration of 0 m/s^2, and a known vertical acceleration of 0 ms^2. In addition, the user can provide that the altitude, horizontal velocity, vertical velocity, horizontal acceleration and vertical acceleration are constant (i.e., substantially not changing at the time when provided to the user interface 510).

The GPS receiver can determine whether the constraints are sufficient to allow the geographical location to be determined using the number of available GPS satellites. In one configuration, the user interface 510 can recommend additional constraints for the user to perform (e.g., stop the vehicle) in order for the geographical location to be determined using the number of available GPS satellites (not shown in FIG. 5A). In addition, the user interface 510 can display an estimated time for the GPS receiver to determine the geographical location (e.g., 10 seconds). In addition, the GPS receiver can estimate an amount of time to obtain a geographic location to a specified error level based on the number of GPS satellites in view to the GPS receiver and the constraints. In another example, an estimate of the amount of time to obtain the geographic location can be determined using an actual location or orbit of the GPS satellites in view to the GPS receiver, wherein information about the actual location is included within the respective GPS signals. In yet another example, the estimate of the amount of time can be improved when the GPS satellite locations and orbits, as well as an approximate estimate of the user's position (e.g., within 100 kilometers), is available.

FIG. 5B is an example user interface 520 that enables a user to provide one or more constraints that describe an aspect of a vehicle's position or motion for determining a geographical location associated with the vehicle. The user interface 520 can be coupled to a GPS receiver within the vehicle. The user interface 520 can display a number of available GPS satellites (e.g., 1 GPS satellite). The user interface 520 can prompt the user to enter known constraints that describe the vehicle's position or motion. For example, the user can indicate that an altitude of the vehicle is unknown, a horizontal velocity is unknown, a known vertical velocity of 0 m/s, a known horizontal acceleration of 0 m/s, and a known vertical velocity of 0 m/s. In addition, the user can provide that the altitude, horizontal velocity, vertical velocity, horizontal acceleration and vertical acceleration are constant.

The GPS receiver can calculate whether the constraints are sufficient to allow the geographical location of the vehicle to be determined using the number of available GPS satellites. In one example, the user interface 520 can indicate to the user that the constraints are insufficient based on the number of available GPS satellites. In addition, the user interface 520 can recommend additional constraints for the user to perform in order for the GPS receiver to determine the geographical location. For example, the user interface 520 can recommend that the user constrain the altitude and horizontal velocity of the vehicle.

Figure 6:
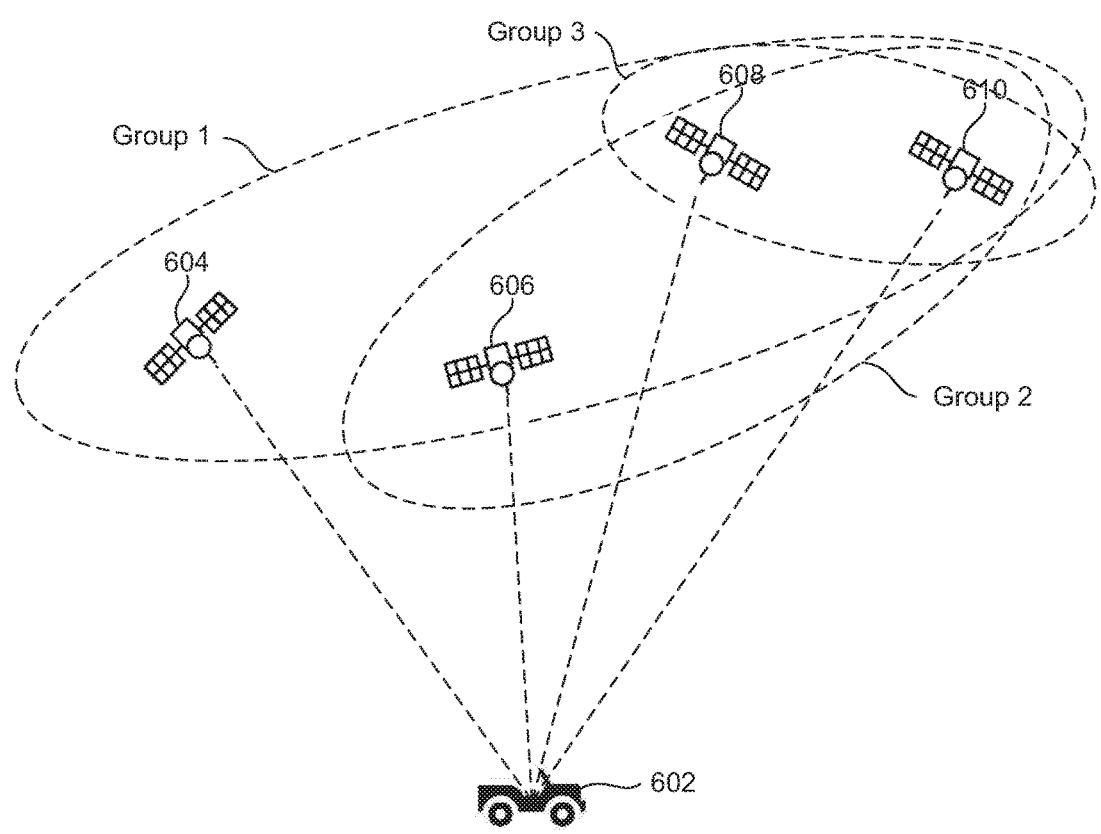
FIG. 6 is an example illustration of various global position system (GPS) satellite groupings for identifying a spoofed GPS signal from a plurality of GPS signals in accordance with an embodiment of the present invention.

FIG. 6 is an example illustration 600 of various global position system (GPS) satellite groupings for identifying a spoofed GPS signal from a plurality of GPS signals. In some scenarios, a GPS receiver within a vehicle 602 can receive an excess of GPS signals (e.g., up to 12 GPS signals from 12 distinct GPS satellites). However, the GPS receiver can determine its geographical location using one to three satellites depending on one or more constraints that describe the GPS receiver's position and/or motion. Therefore, the GPS receiver can exclude certain GPS signals to determine whether the geographical location that is calculated using the GPS signals remains substantially the same. The geographical location not remaining substantially the same can indicate that one or more of the GPS signals are contaminated or spoofed.

As shown in FIG. 6, the GPS receiver in the vehicle 602 can receive four GPS signals from each of the GPS satellites 604, 606, 608 and 610 (i.e., Group 1). The GPS receiver can determine a first potential geographical location of the vehicle 602 using the four GPS signals. The GPS receiver can subsequently drop the GPS signal received from the satellite 604 and receive GPS signals from each of the GPS satellites 606, 608 and 610 (i.e., Group 2). Since the GPS receiver can receive GPS signals from at least one of the satellites 606, 608, and 610 in multiple positions of the satellite's orbit around the Earth, the GPS receiver can determine a second, independent potential geographical location of the vehicle 602 using the GPS signals received from the satellites 606, 608 and 610. The GPS receiver can subsequently drop the GPS signal(s) received from the satellite 606 and receive GPS signals from each of the GPS satellites 608 and 610 (i.e., Group 3). The GPS receiver can use the GPS signals from the GPS satellites 608 and 610 in order to determine a third potential geographical location of the receiver and the vehicle 602. In addition, the GPS receiver can create additional groupings with the satellites 604, 606, 608 and 610 that are not described or shown (e.g., drop the satellite 604 and keep the satellites 606, 608, and 610).

The GPS receiver can compare the first potential geographical location, the second potential geographical location, and the third potential geographical location. In one aspect, the potential geographical locations cannot differ by more than a predetermined value (e.g., 50 meters in each of the three dimensions). As an example, the geographical location determined using the GPS signals from Group 1 can differ by more than the predetermined value as compared to the geographical location determined using the GPS signals from Group 2 and the GPS signals from Group 3. Thus, the GPS receiver can infer that the GPS signals from the satellite 604 are spoofed or contaminated because the satellite 604 is not included in Group 2 and Group 3, but is included in Group 1. The user can be alerted that the GPS signals received from the satellite 604 are contaminated and the user can have the ability to turn off GPS signals from the satellite 604. Alternatively, the user can be informed that one or more groupings of GPS satellites are determining potential geographical locations that are suspected to be inaccurate, such that the user can have the ability to restrict the GPS receiver from determining the geographical location using those groupings.

Figure 7:
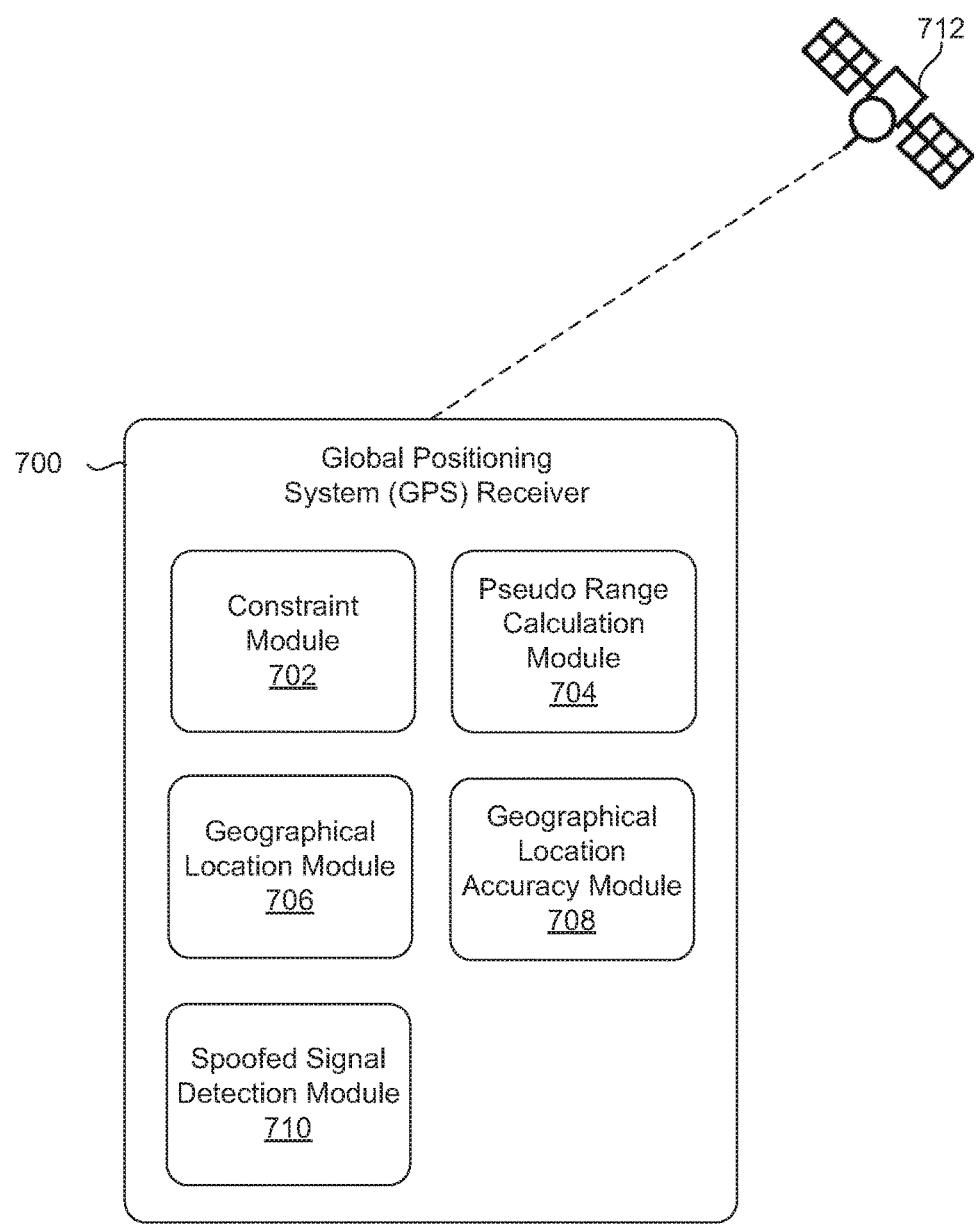
FIG. 7 is a block diagram of a global position system (GPS) receiver communicating with at least one GPS satellite in order to determine a geographical location of the GPS receiver in accordance with an embodiment of the present invention.

FIG. 7 is a block diagram of a global position system (GPS) receiver 700 communicating with at least one GPS satellite 712 in order to determine a geographical location of the GPS receiver 700. The GPS receiver 700 can include a constraint module 702 configured to receive one or more constraints that describe at least one characteristic of a global position system (GPS) receiver when a number of GPS satellites within a line of sight to the GPS receiver is below a defined value. The GPS receiver 700 can include a pseudo range calculation module 704 configured to calculate a plurality of pseudo ranges between the GPS receiver and the number GPS satellites, wherein the plurality of pseudo ranges are to various orbital positions of the GPS satellites over a period of time. The GPS receiver 700 can include a geographical location module 706 configured to determine the geographical location of the GPS receiver using the plurality of pseudo ranges and known correlations with respect to previous geographical locations associated with the GPS receiver.

In one example, the constraint module 702 can be further configured to receive the one or more constraints, including a position associated with the GPS receiver in X, Y, or Z dimensions, a velocity associated with the GPS receiver in X, Y, or Z dimensions, and an acceleration associated with the GPS receiver in X, Y, or Z dimensions. In addition, the constraint module 702 can be further configured to receive the one or more constraints from at least one of: a user, or a sensor that measures at least one of an altitude, velocity or acceleration associated with the GPS receiver.

In one configuration, the GPS receiver 700 can include a geographical location accuracy module 708 configured to calculate an estimated accuracy of the geographical location based on a number of GPS signals, a clock type associated with the GPS receiver, and the one or more constraints. In addition, the GPS receiver 700 can include a spoofed signal detection module 710 configured to determine that a number of GPS signals being received from the GPS satellites are above the defined value; organize the GPS signals into at least two distinct GPS signal groupings, wherein the distinct GPS signal groups have a descending number of GPS signals; and compare potential geographical positions of the GPS receiver determined using the distinct GPS signal groupings in order to identify a spoofed GPS signal from the GPS signals.

In accordance with one embodiment of the present invention, a method for determining a geographical location is disclosed. The method can comprise determining that a number of global positioning system (GPS) satellites within a line of sight to a GPS receiver is below a defined value. The method can also comprise receiving one or more constraints that describe at least one characteristic of the GPS receiver's motion. The method can further comprise calculating a plurality of pseudo ranges between the GPS receiver and the number of GPS satellites, wherein the plurality of pseudo ranges are to various orbital positions of the GPS satellites over a period of time. In addition, the method can comprise determining the geographical location of the GPS receiver and a motion associated with the GPS receiver using the plurality of pseudo ranges and the one or more constraints that describe the motion of the GPS receiver.

In one aspect, the method further comprises determining the geographical location and the motion associated with the GPS receiver using known correlations with respect to at least one of previous geographical locations, accelerations, or velocities associated with the GPS receiver. In one example, the motion associated with the GPS receiver includes an acceleration or velocity of the GPS receiver. In another example, receiving the one or more constraints includes receiving at least one of a position associated with the GPS receiver in X, Y, or Z dimensions, a velocity associated with the GPS receiver in X, Y, or Z dimensions, and an acceleration associated with the GPS receiver in X, Y, or Z dimensions.

In one aspect, the method further comprises receiving the one or more constraints from a user in response to informing the user that the number of GPS satellites in the line of sight to the GPS receiver is insufficient for determining the geographical location. In addition, the method further comprises receiving the one or more constraints by a sensor that measures at least one of an altitude, velocity or acceleration associated with the GPS receiver. In addition, the method further comprises utilizing a Kalman filter for determining the geographical location and motion of the GPS receiver, wherein the Kalman filter generates the geographical location and motion of the GPS receiver using the known correlations.

In one aspect, the method further comprises calculating an estimated accuracy of the geographical location based on a number of GPS signals received from the GPS satellites, a clock type associated with the GPS receiver, and the one or more constraints; and providing the estimated accuracy of the geographical location to a user. In addition, the method further comprises receiving additional constraints from the user in order to improve the estimated accuracy of the geographical location.

Various techniques, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Figure 8:
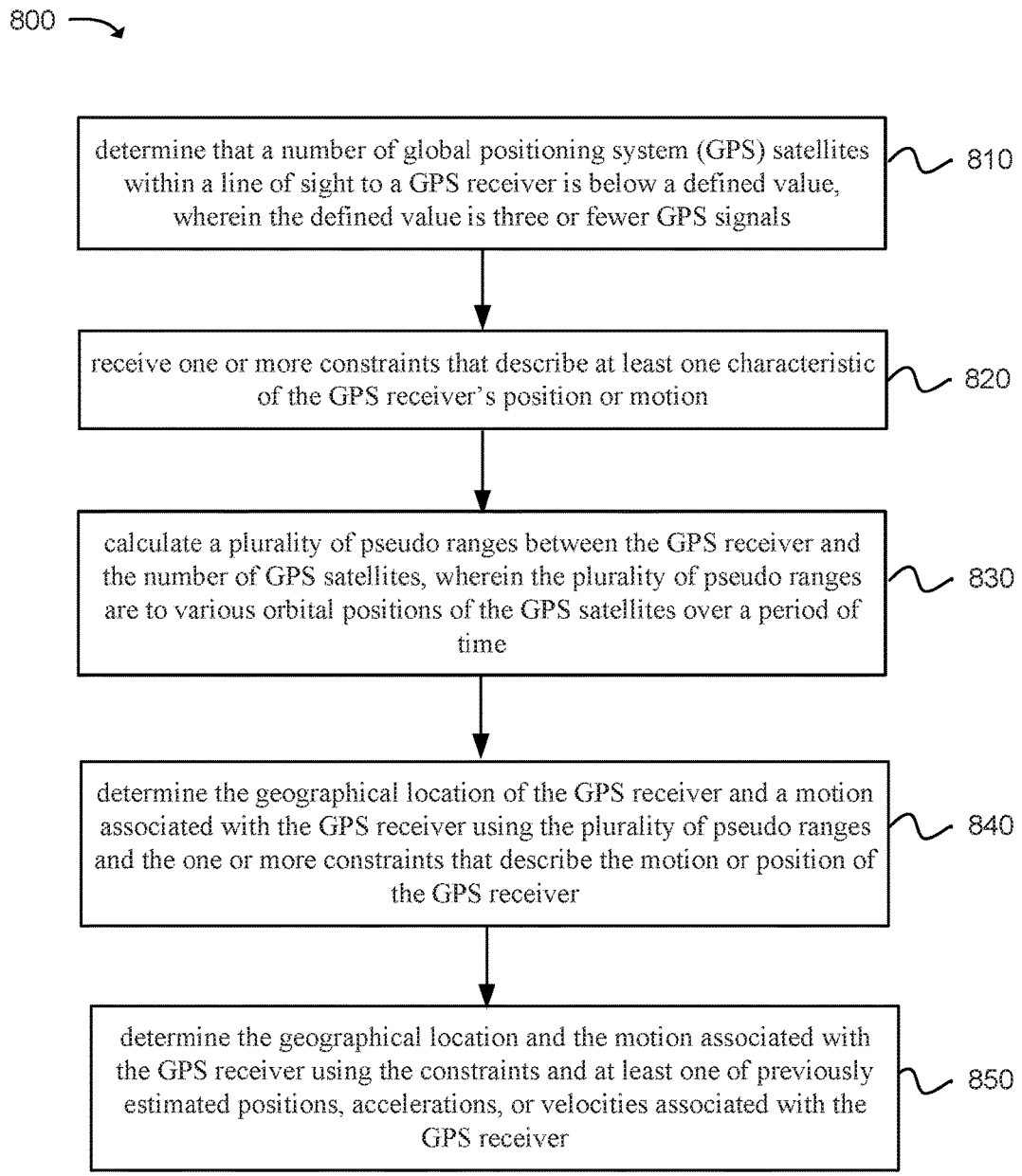
FIG. 8 illustrates a flow diagram a method for determining a geographical location in accordance with an example of the present disclosure.

FIG. 8 illustrates a method 800 for determining a geographical location in accordance with an example of the present disclosure. At operation 810, the method can comprise determining that a number of global positioning system (GPS) satellites within a line of sight to a GPS receiver is fewer or less than four GPS satellites. At operation 820, the method can comprise receiving one or more constraints that describe at least one characteristic of the GPS receiver's position or motion. At operation 830, the method can comprise calculating a plurality of pseudo ranges between the GPS receiver and the number of GPS satellites, wherein the plurality of pseudo ranges correspond to various orbital positions of the GPS satellites over a period of time. At operation 840, the method can comprise determining the geographical location of the GPS receiver and a motion associated with the GPS receiver using the plurality of pseudo ranges and the one or more constraints that describe the motion or position of the GPS receiver. At operation 850, the method can comprise determining the geographical location and the motion associated with the GPS receiver using the constraints and at least one of previously estimated positions, accelerations, or velocities associated with the GPS receiver.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A GPS receiver having computer circuitry configured to:
  receive a number of global positioning system (GPS) signals from one or more GPS satellites;
  receive one or more constraints that describe at least one characteristic of the GPS receiver's motion or position when the number of GPS signals are below a defined value, wherein the one or more constraints enable a determination of a geographical location associated with the GPS receiver using the number of GPS signals from the one or more GPS satellites;
  calculate a plurality of pseudo ranges between the GPS receiver and the one or more GPS satellites at various orbital positions of the one or more GPS satellites over a period of time;
  determine the geographical location of the GPS receiver using the plurality of pseudo ranges and known correlations with respect to at least one of previous geographical locations or motions associated with the GPS receiver;
  determine that a number of GPS signals being received from the one or more GPS satellites are above the defined value;
  organize the GPS signals into at least two distinct GPS signal groupings, wherein the distinct GPS signal groups have a descending number of GPS signals; and
  compare potential geographical positions of the GPS receiver determined using the distinct GPS signal groupings in order to identify a spoofed GPS signal from the number of GPS signals.

2. The GPS receiver of claim 1, wherein the number of GPS signals are from four GPS satellites, wherein the computer circuitry is configured to drop the spoofed GPS signal from any one of the number of GPS satellites, such that the computer circuitry is configured to determine the geographical location of the GPS receiver using GPS signals from fewer than four GPS satellites.

3. The GPS receiver of claim 1, wherein the computer circuitry is further configured to alert a user of the identified spoofed GPS signal from the number of GPS satellites.

4. The GPS receiver of claim 1, wherein the computer circuitry is further configured to restrict, in response to user input, the GPS receiver from determining the geographical location based on one group of the distinct GPS signal groups.

5. A system for determining a geographical location, the system comprising:
  a constraint module configured to receive one or more constraints that describe at least one characteristic of a global position system (GPS) receiver when a number of GPS satellites within a line of sight to the GPS receiver is below a defined value;
  a pseudo range calculation module configured to calculate a plurality of pseudo ranges between the GPS receiver and the number GPS satellites, wherein the plurality of pseudo ranges are to various orbital positions of the GPS satellites over a period of time; and
  a geographical location module configured to determine the geographical location of the GPS receiver using the plurality of pseudo ranges and the constraints with respect to at least one of previous geographical locations or motions estimated by the GPS receiver; and
  a spoofed signal detection module configured to:
    determine that a number of GPS signals being received from the GPS satellites are above the defined value;
    organize the GPS signals into at least two distinct GPS signal groupings, wherein the distinct GPS signal groups have a descending number of GPS signals; and
    compare potential geographical positions of the GPS receiver determined using the distinct GPS signal groupings in order to identify a spoofed GPS signal from the GPS signals.

6. The system of claim 5, wherein the number of GPS satellites is four GPS satellites, wherein the computer circuitry is configured to drop the spoofed GPS signal from any one of the number of GPS satellites, such that the computer circuitry is configured to determine the geographical location of the GPS receiver using GPS signals from fewer than four GPS satellites.

* * * * *